United States Patent
Chennapragada et al.

(10) Patent No.: US 6,701,368 B1
(45) Date of Patent: Mar. 2, 2004

(54) PROVIDING A STREAM OF DATA TO A BROWSER TO UPDATE PROPERTIES ON A PAGE

(75) Inventors: Krishna Rao Chennapragada, Milpitas, CA (US); Keith Waldorf, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/299,945

(22) Filed: Apr. 26, 1999

(51) Int. Cl.[7] ............................................. G06F 15/16
(52) U.S. Cl. ...................... 709/228; 709/223; 709/224; 709/225; 709/226; 709/227; 709/236; 709/202; 709/203; 709/206; 709/217; 709/219
(58) Field of Search ................................ 709/102, 236, 709/202, 203, 217, 219, 218, 224, 223–227, 206, 228; 345/352, 335; 707/513, 501, 512, 10, 203; 705/40

(56) References Cited

U.S. PATENT DOCUMENTS

| | | | | |
|---|---|---|---|---|
| 5,760,768 A | * | 6/1998 | Gram | 345/747 |
| 5,978,828 A | * | 11/1999 | Greer et al. | 709/224 |
| 6,038,588 A | * | 3/2000 | Nagarajayya et al. | 709/102 |
| 6,115,039 A | * | 9/2000 | Karren et al. | 345/335 |
| 6,121,968 A | * | 9/2000 | Arcuri et al. | 345/352 |
| 6,266,681 B1 | * | 7/2001 | Guthrie | 707/501 |
| 6,314,451 B1 | * | 11/2001 | Landsman et al. | 709/203 |
| 6,317,761 B1 | * | 11/2001 | Landsman et al. | 707/513 |
| 6,341,316 B1 | * | 1/2002 | Kloba et al. | 709/248 |
| 6,421,717 B1 | * | 7/2002 | Kloba et al. | 709/223 |
| 6,470,386 B1 | * | 10/2002 | Combar et al. | 709/224 |
| 6,553,412 B1 | * | 4/2003 | Kloba et al. | 709/227 |

OTHER PUBLICATIONS

Client–site JavaScript Reference Version 1.3 (1994).*

* cited by examiner

*Primary Examiner*—Wellington Chin
*Assistant Examiner*—Chuong Ho
(74) *Attorney, Agent, or Firm*—Hickman Palermo Truong & Becker LLP

(57) ABSTRACT

A mechanism for supplying a stream of data to a browser is provided. The browser periodically refreshes a frame document, transmitting a request for the frame document to an HTTP server. When a network element receives a request from a browser for a frame document, it generates a new frame document, and supplies it to the browser. The new version of the frame document may include new definitions for functions, that, as redefined, reflect the current status of a network element. The updates may be retrieved by invoking functions.

18 Claims, 9 Drawing Sheets

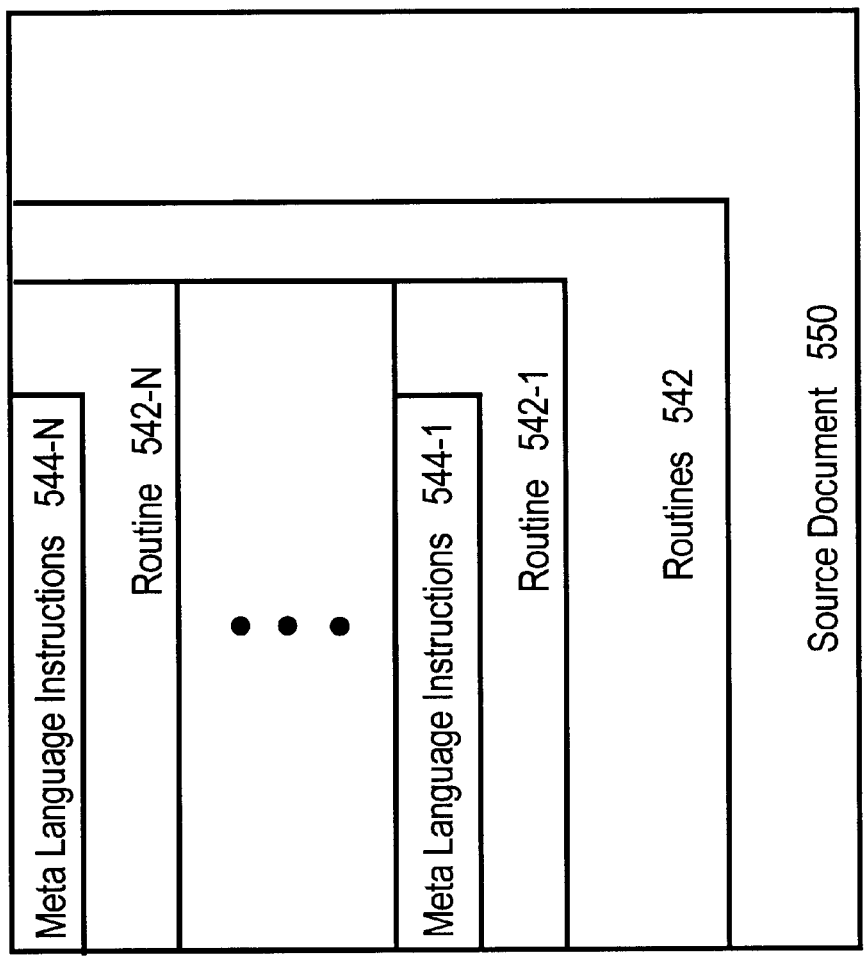

DISPLAY TABLE A-1

FIG. 8

PROVIDING A STREAM OF DATA TO A BROWSER TO UPDATE PROPERTIES ON A PAGE

FIELD OF THE INVENTION

The present invention relates to browsers, and in particular, to providing a stream of data to a browser to update page properties.

BACKGROUND OF THE INVENTION

The use of networks is proliferating among various network users that range from small operations to large enterprises. As the use of networks increases, the dependency of network users upon networks increases, and the capability to manage networks becomes more critical. Large enterprises usually dedicate staff to the task of network management. Smaller operations, such as small businesses, may allocate the task of network management to "multi-roled" staff, who are also allocated to other information systems management tasks. For example, a single person in a small legal office may perform a variety of duties related to managing information systems, including, for example, ordering software, hardware, and computer related services, debugging hardware and software problems as they may arise, and managing the network in the legal office.

A key element for managing a network is network device management software, and in particular, the user interface through which the user interacts with the network device management software. Network device management software is software used to monitor and configure a particular network element. A network element is a computer system primarily dedicated to processing network traffic on a network. Network elements include network devices, such routers, gateways, and switching devices. A user interacts with the network device management software through a user interface.

A conventional user interface is a command line interface. A command line interface is a "roll and scroll" terminal interface through which a user inputs keywords and other parameters. The keywords and other parameters represent commands. The interface usually transmits the user inputted commands to the network element specified by the user, and in particular, to a process on the specified network element that carries out the tasks indicated by the commands ("command processor"). The commands that may be supported are numerous, and include commands for configuring a device, or commands for retrieving information about the configuration of the particular network element. Examples of commands include a command for retrieving information about whether a port is operational, active or inactive, or a command for shutting down a port.

One advantage of the command line processor is that it may be run by any computer coupled to a network that is configured to run as a terminal, such as work stations and personal computers that may run terminal emulators. A disadvantage of the command line interface is that it requires a user to know numerous commands. A user, such as a multi-role user, may use the command line interface too infrequently to become proficient in the use of commands. For such users, the command line processor may be too cumbersome to use. In addition, the command line interface is subject to the well known limitations of roll and scroll interfaces.

A mechanism that addresses the drawbacks of the command line interface is a graphical user interface ("GUI"). A GUI displays various windows with graphical controls, such as menus, list boxes, action buttons, and radio buttons. Many of the graphical controls are labeled. The graphical icons and labels communicate what commands may be issued though the interface, and how the graphical controls may be manipulated to issue the commands.

One drawback of the GUI stems from the way in which it is typically implemented. Typically, a GUI may be implemented in software that requires that the software is installed on a computer before the GUI may run on the computer. For example, a GUI developed to run as an application in the Windows operating system from Microsoft must be installed on a personal computer before the GUI may be run on the computer. Thus, a GUI may be unavailable to network administrators who are at locations lacking a computer that has the necessary installed software. In addition, software licenses may have to be purchased, maintained, and tracked for every computer on which the GUI is installed. When software is updated, each computer on which the software resides must be reconfigured. Finally, the cost of the software is often economically unjustified, as in the case of, for example, small businesses with multi-role users whose use and need for the network device management software may be intermittent.

A solution that addresses drawbacks due to installation requirements is to implement the GUI in the Java (R) programming language. Java-based GUIs may run on Java-enabled browsers, which are available on many computers. A browser is a computer component configured to retrieve data over a network using the Hypertext Transport Protocol ("HTTP"), and to execute code included in the retrieved data. Typically, the retrieved data is a file containing code written in the Hypertext Markup Language ("HTML").

Java enabled browsers may interpret Java byte code. In response to reading a file that may contain HTML or Java code, a browser may render a display in a window. A browser uses a window to display any item rendered by the browser. This window is referred to as the browser's display. The display may contain other windows.

At any particular moment, a GUI may reflect information about a particular network element. A browser may retrieve code used to generate the GUI from the network element reflected by the GUI, and in particular, from an HTTP server residing on the network element. An HTTP server is a server that follows the HTTP protocol. Network elements that include HTTP servers often store data served by the HTTP server in the static memory of the network element.

Many network elements are equipped with flash memory as their only form of static memory. The cost of manufacturing these network elements thus depends on the amount of flash memory used in the network elements. To supply these types of devices at competitive prices, storage requirements for Java based programs for GUIs may be too great.

To overcome the storage requirements of Java, GUIs may be written using code that requires less storage, such as HTML code. To run a GUI written in HTML, a browser may download a file, and then interpret it.

A desirable feature of any GUI is to reflect in real time the status of a particular network element. For example, a GUI of a network device management program may include graphical controls that indicate the status of the ports of one or more network elements. When one of the ports becomes disabled, the graphical control is updated almost immediately to indicate the new status of the port.

Unfortunately, to reflect the new status on an HTML based GUI, the file containing HTML code that defines the GUI may have to be refreshed, that is, reloaded and reinterpreted. Even more, reflecting real-time information may require periodic refreshing, resulting in undesirable amounts of overhead in a variety of forms. For example, the network element regenerates the file periodically, the regenerated files are retransmitted over the network to the client running the browser, and the browser on the client reinterprets the intermittently reloaded file. Refreshing the browser may require the user to enter a command manually. This is undesirable because it requires periodic action by the user. It would be preferable to have a way to passively monitor the changing information. Further, when the GUI or browser page includes large embedded graphics, a refresh may take a long time.

Based on the foregoing, it is clearly desirable to provide a GUI that interacts with network elements for the purposes of network device management and that runs on a browser, and that reduces the amount of code that must be stored on a network element and the overhead attendant to re-transmitting a file.

SUMMARY OF THE INVENTION

A mechanism for supplying a stream of data used to update information displayed by a browser is described. The browser periodically refreshes a frame document, transmitting a request for the frame document to a network device. When the network device receives a request from a browser for a frame document, it generates a new version of the frame document, and supplies it to the browser. The new version of the frame document may include new definitions for routines which, as redefined, reflect current information about the network element. The current information may be retrieved by invoking these routines. The frame may be defined to have no height or width.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5A is a block diagram depicting an exemplary source document;

FIG. 8 depicts a display table that displays information about ports.

DETAILED DESCRIPTION OF THE PREFERRED EMBODIMENT

A method and apparatus for providing a stream of data to a browser is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OVERVIEW

A technique for supplying a stream of data used to update a GUI rendered by a browser is described. The browser periodically refreshes a frame document, transmitting a request for the frame document to an HTTP server on a network element. When the HTTP server receives a request from a browser for a frame document, it generates a new frame document, and supplies it to the browser. The new version of the frame document may include new definitions for routines which, as redefined, reflect current information about the network element. The current information may be retrieved by invoking these routines. Documents and frame documents are later described in greater detail.

Figure 1:
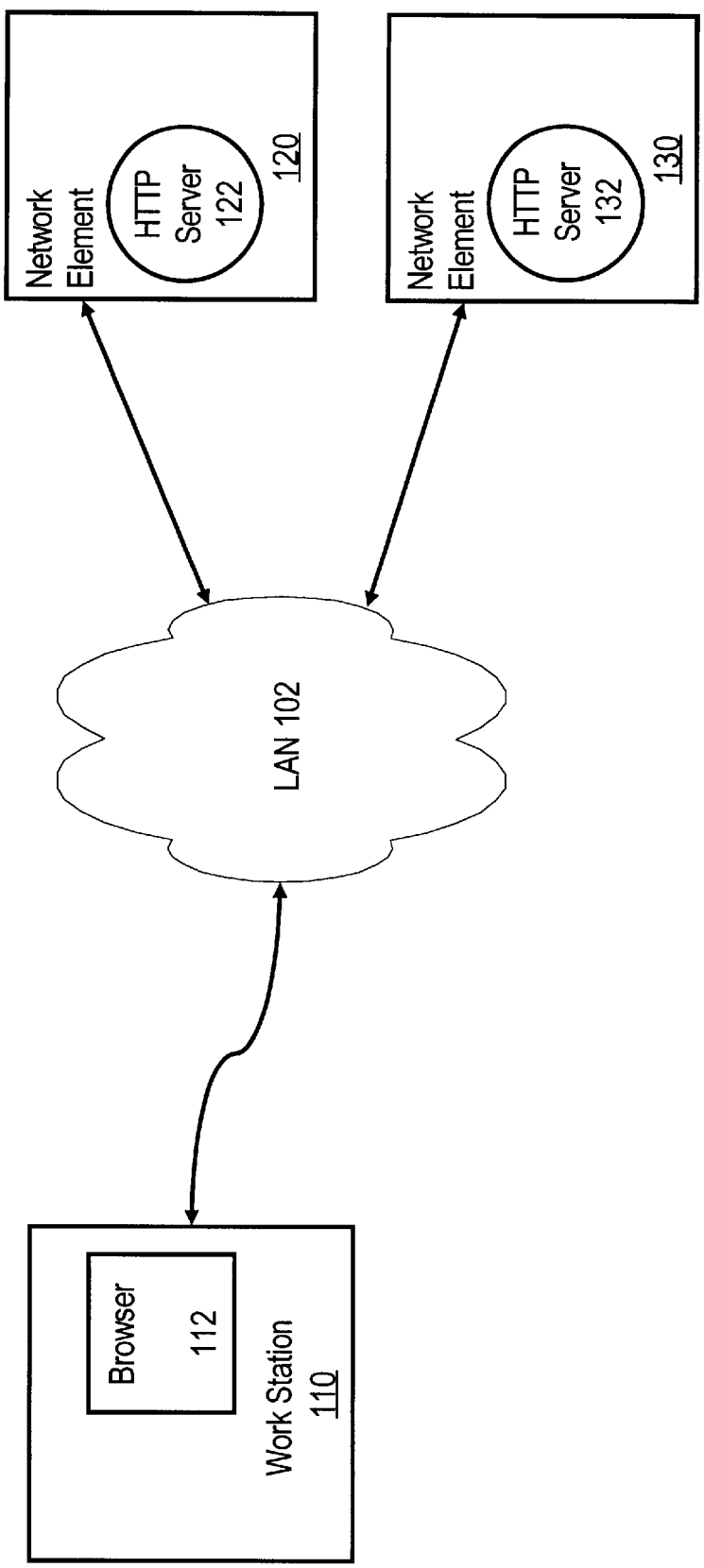
FIG. 1 is an exemplary network architecture.

FIG. 1 shows an exemplary network architecture upon which an embodiment of the present invention may be implemented. The exemplary network architecture includes a local area network LAN 102, which is coupled to various network devices. A network device is any device to which network traffic may be directed such as work stations, printers, and network elements, such as routers and switches. Some of the network devices coupled to LAN 102 include workstation 110, and network elements 120 and 130. One or more browsers, such as browser 112, run on workstation 110.

HTTP servers 122 and 132 reside on network elements 120 and 130. HTTP server 122 supplies documents and files requested by a client, such as browser 112. Documents shall be later defined. The documents supplied by HTTP server 122 may be stored within network element 120, or generated in response to HTTP server 122 receiving a request for the document. HTTP server 132 operates in manner similar to that described for HTTP server 122.

The techniques described herein for supplying a stream of data to a browser are illustrated using an HTTP server that resides on a network element. The HTTP server periodically supplies a frame document to the browser. The frame document is used to indicate the properties of a GUI generated by the browser. However, use of an HTTP server that resides on a network element is not required. An HTTP server residing on any network device is suitable. In addition, the data retrieved through a frame document may be used to update any property defined by a document loaded by a browser.

EXEMPLARY PAGES AND DOCUMENTS

Techniques are described herein for using a browser to periodically retrieve information without having to refresh an entire page. The browser generates the GUI, and receives data for maintaining information in the GUI, through the execution of documents supplied to the browser. A description of an exemplary document that may be used for this purpose is provided.

Figure 2:
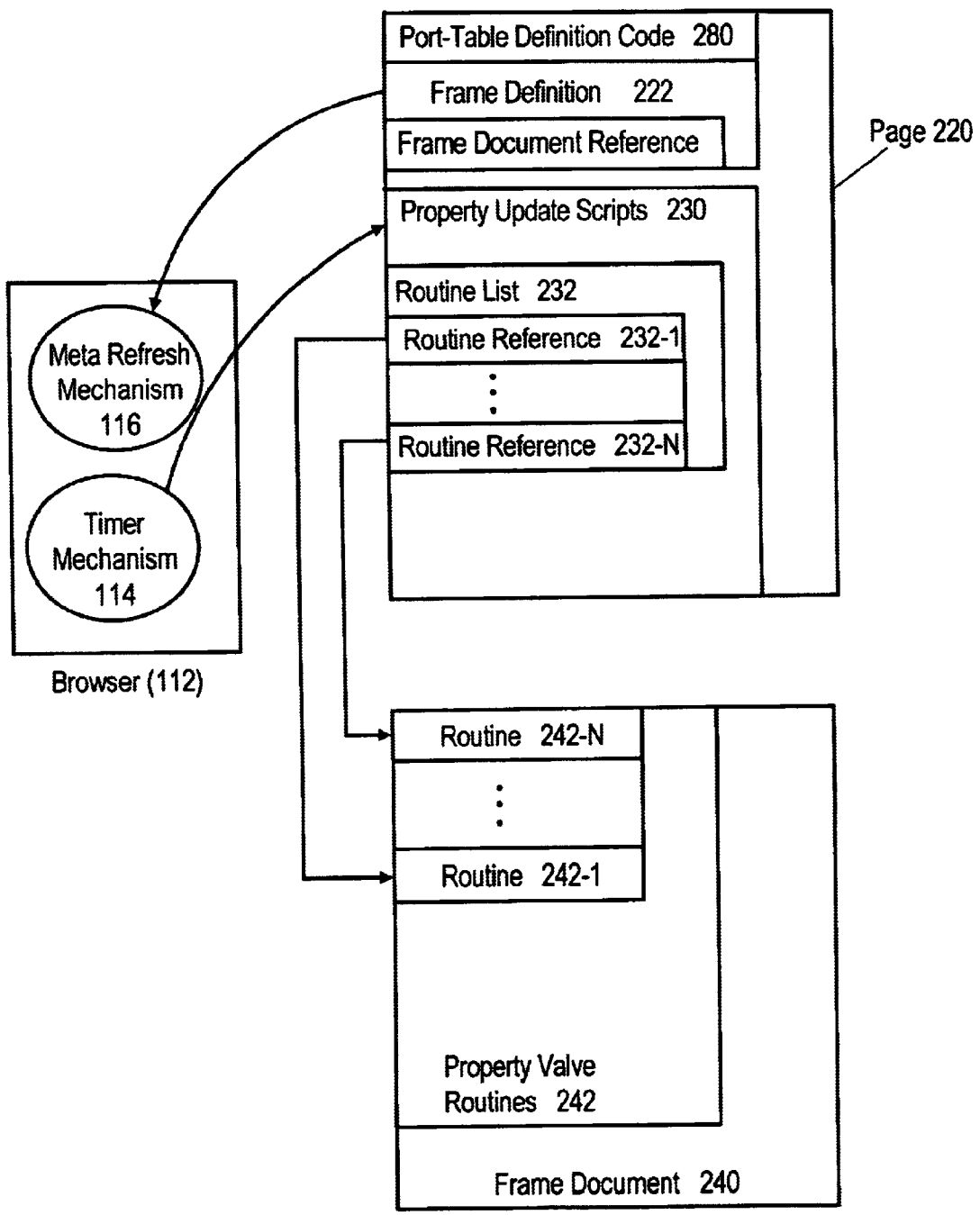
FIG. 2 is a block diagram depicting an exemplary page and frame document, and property update scripts defined by the page that reference routines in a frame document.

FIG. 2 depicts page 220 and frame document 240. A document is a set of instructions that define the content that may be displayed in a portion of a browser display. A document includes instructions interpreted by a browser. A page is a document that defines, directly or indirectly, the entire content of a display generated by a browser. An entity generated by a browser in response to executing code in a document is referred to as a page property. For example, instructions in a page may define various objects which are generated by a browser when executing the instructions. Such objects include text, hyperlinks, references to images, graphical controls, collections of graphical controls, such as tables, or a set of selection buttons. A document may contain code that specifies instructions that are executed upon the occurrence of certain events, such as a user clicking on a graphical control defined by a document, or the loading or refreshing of a page or document.

Page 220 is a page provided by HTTP server 122 on network element 120 for the purpose of generating a GUI that retrieves and displays information about the current state of network element 120. Thus, page 220 could be one page generated by a network management system that displays a current state of a network device, such as a router or switch. Page 220 contains HTML code and JavaScript code. JavaScript is a scripting language that may be interpreted by a browser upon the occurrence of certain event. (Such events may include mouse clicks, browser refresh, etc.). The manner in which network element 120 and HTTP server 122 generate page 220 is later described.

Figure 8:
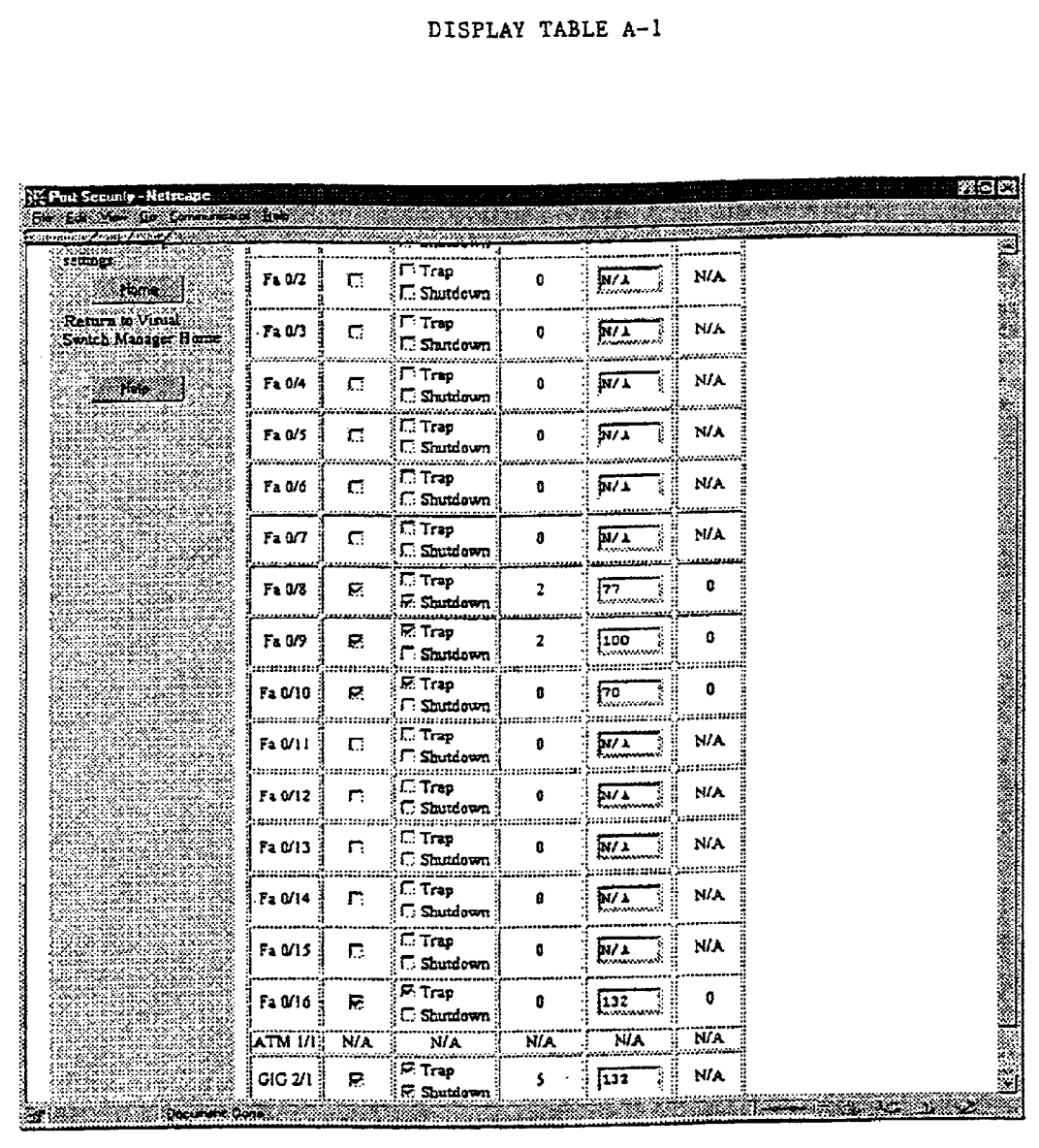

Page 220 includes port-status table definition 280, which defines a display table depicting information about each port on network element 120. An example of a display table is shown as Display Table A-1 in FIG. 8. Each row in the display table contains a collection of graphical controls that may indicate information about a port, including the port's name, or the port status. A port status may be UP or DOWN. The collection of graphical controls may also contain a command button, which may be clicked by a user to load a page for configuring a particular port.

Port-status table definition 280 may be a combination of JavaScript and HTML. For example, port-status table definition 280 may include a table tag defined in HTML. A tag is a set of HTML instructions used to define a property of a document, such as a table, form, or an area of text. Alternatively, the port-status table definition 280 may contain JavaScript code used to define the attributes of a display table and each particular row. The number of rows and type of information displayed depend on the device type of network element 120. JavaScript may contain instructions that when executed by browser 112, define a display table according to the device type, in a manner that will be described in further detail.

Frame definition 222 is a set of instructions that define a frame. A frame is a window that may be rendered within the display of a browser. The properties of a frame are governed by code in a document ("frame document"). A frame may contain a reference to the frame document. For example, a frame may be defined using an HTML frame tag that references a frame document. Frame definition 222 includes frame document reference 223, which refers to frame document 240.

In HTML, every frame definition must include a height value and a width value that describe the visible size of the frame. A frame, such as that defined by Frame definition 222, may be defined to have dimension values equal to zero, that is, no height and width. When a frame is defined in this manner, a window for the frame is not rendered on the browser's display. The frame document may nevertheless be used to define objects, which are not displayed, and which are used for other purposes, such as retrieving and storing information. For example, a frame document may define routines referenced by code in the page. A routine is an executable element, which when executed, generates a value and returns the value to the caller of the routine. Routines include object methods and functions, such as those that may be defined by JavaScript code.

SCRIPTS THAT RETRIEVE UPDATED INFORMATION THROUGH ROUTINES IN A FRAME DOCUMENT

Property update scripts 230 is a set of instructions written in a scripting language, such as JavaScript, which are periodically interpreted by a browser to update page properties, such as graphical controls defined by the page and rendered by a browser. The term "periodically" refers to automatically updating a property at time intervals without requiring affirmative action by a user, such as a user clicking a graphical control for refreshing a page.

A mechanism that causes browsers 112 to periodically interpret the scripting language is a timer mechanism 114 in browser 112. Timer mechanism 114 causes browser 112 to execute property update scripts at time intervals specified by page 220.

When browser 112 interprets property update scripts 230, it invokes routines referenced by routine list 232. Routine list 232 is a collection of routine references 232-1 through 232-N. Each routine reference may refer to a routine defined by frame document 240. In particular, a routine reference 232 may refer to one of property value routines 242. Property value routines 242 are a collection of routines 242-1 to 242-N. A property value routine 242 may return values that specify a property of page 220, such as the property of graphical controls displayed in a port-status table that are used to indicate the status of a port on a network element. Routine reference 232-1, for example, may reference routine 242-1. Routine 242-1 is referred to herein as "port0_status( )". The routine port0_status( ) is defined by the following JavaScript code:

```
port0_status() {
    int i = 1
    return i
}
```

Port0_status( ) returns the value of variable i. The return value of port0_status( ) may indicate the status of a port, for example, a port 0. A returned value of 1 indicates that the port is active.

PERIODICALLY RELOADING A FRAME DOCUMENT TO SUPPLY UPDATED DATA

Frame document 240 is periodically reloaded from a HTTP server 122 and reinterpreted by browser 112. When HTTP server 122 receives a request from browser 112 to reload a frame document 240, it generates a new version of frame document 240, and supplies it to browser 112. The new version of frame document 240 may include new definitions for routines 242 that, as redefined, reflect the current status of network element 120. The updates may be retrieved by invoking routines 242.

For example, frame definition 222 may contain a meta-refresh tag. A meta-refresh tag is a tag in a document that specifies that the document is to be reloaded at specified intervals. As a result, periodic requests are transmitted by browser 112 to HTTP server 122 to supply frame document 240. When HTTP server 122 receives a request to supply frame document 240, HTTP server 122 supplies a new version of frame document 240. The regenerated frame document may contain new instructions redefining routines 242, as illustrated below.

For purposes of illustration, assume that for a particular router of a network, which is managed by a network management system, port 0 is active for a period of time, and then becomes inoperable ("inactive"). While port 0 is active, HTTP server 122 returns frame documents that define a value of port 0_status( ) as shown above. When port 0 becomes inactive, HTTP server 122 returns a frame document that contains code redefining a value for port0_status( ) as shown below.

```
port0_status() {
    int i = 0
    return i
}
```

Port0_status( ) returns the value of variable i. The returned value of 0 indicates that the port is inactive. When browser 112 receives a new version of frame document 240, browser 112 interprets frame document 240, and updates or regenerates the display accordingly. As a result, the browser automatically updates itself to display the current status of the router.

RETRIEVING THE PAGE DEFINING A GUI AND DATA USED TO UPDATE THE INTERFACE

Figure 3:
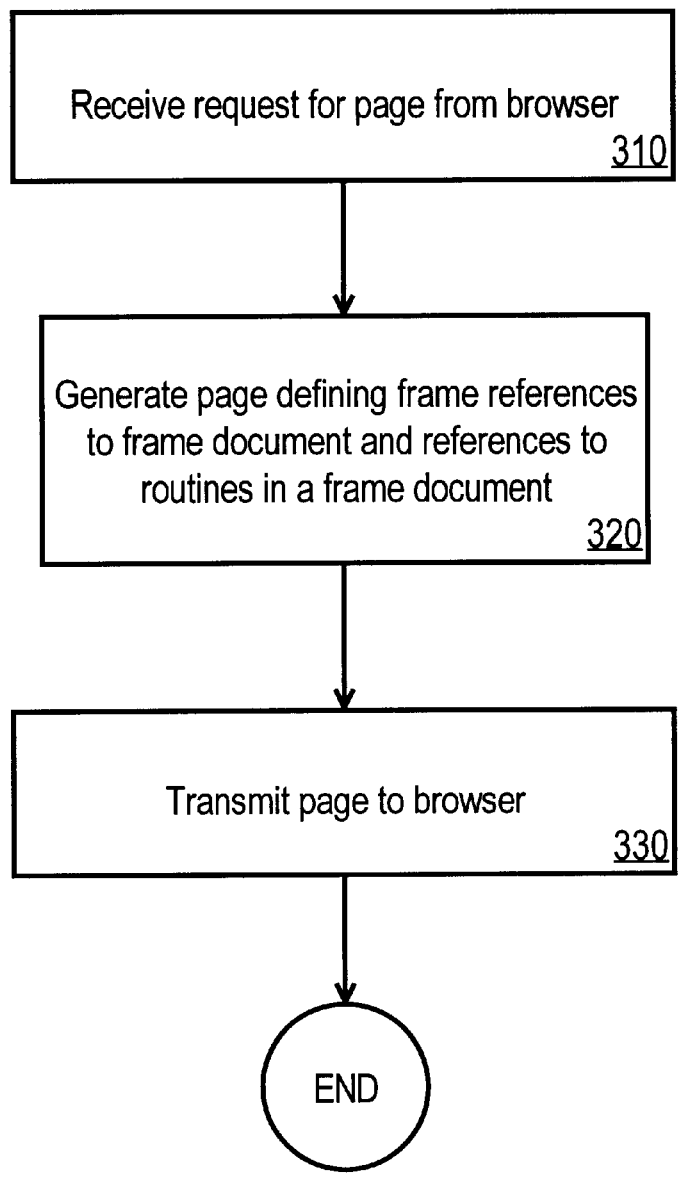
FIG. 3 is a flow chart showing a process for providing a page that references routines in a frame document.
Figure 4:
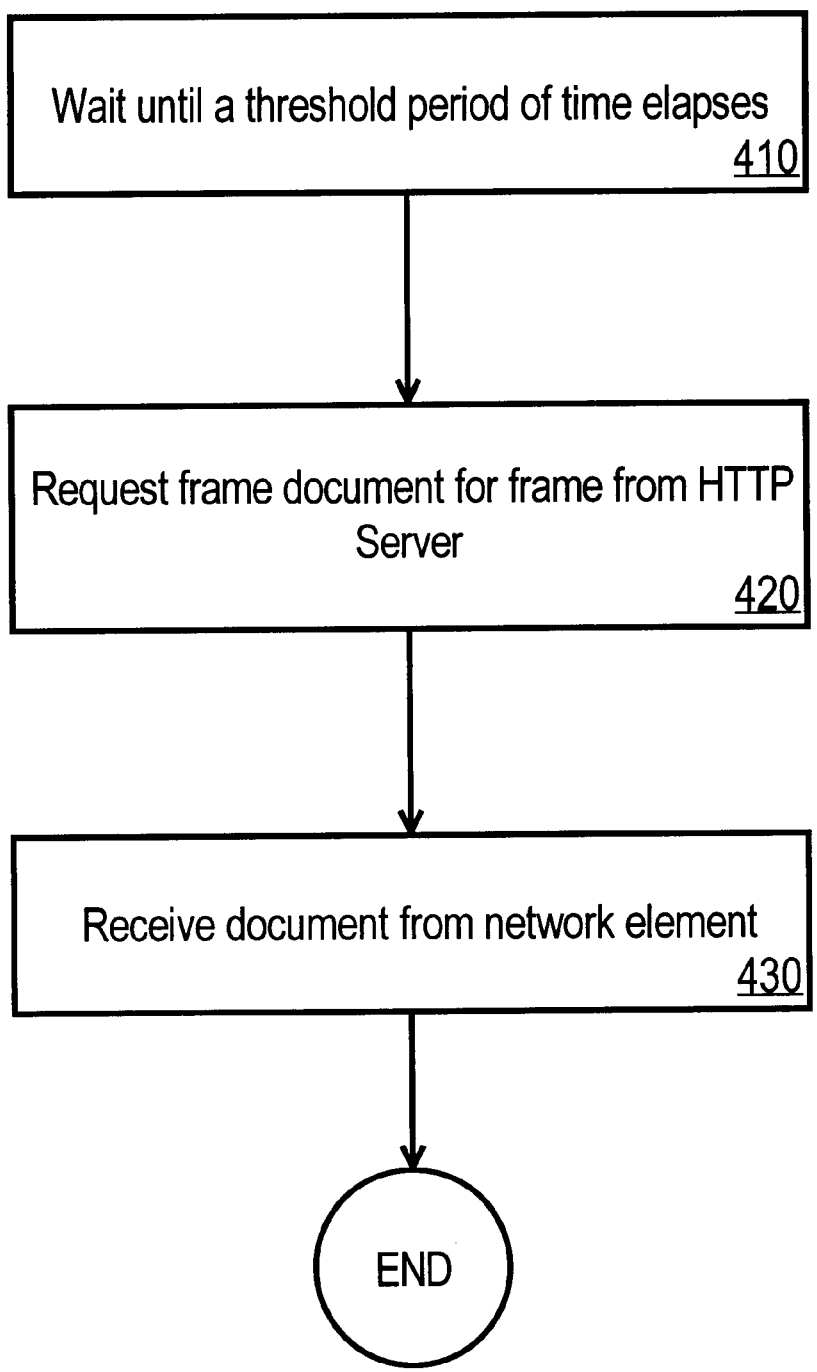
FIG. 4 is a flow chart showing a process for periodically providing a frame document to a browser.

Page properties are updated according to data transported via a reloaded frame document. FIG. 3 shows blocks depicting a process for supplying the page. FIG. 4 shows blocks depicting a process for reloading the page. This process is illustrated using the browser, network, and documents depicted in FIG. 1 and FIG. 2. The process depicted by FIG. 3 may be performed by HTTP server 122 and network element 120 in response to receiving a request to supply a page 220.

Referring to FIG. 3, at block 310, a request is received for a specific page. In this example, HTTP server 122 receives a request to supply page 220.

At block 320, a page is generated. The generated page defines a frame, frame document, and references routines in the frame. In this example, page 220 is read from the static memory of network element 120.

At block 330, page 220 is transmitted to browser 112.

FIG. 4 shows blocks that depict a process for periodically receiving data used to update the GUI defined by page 220. At block 410, a browser waits for a threshold period of time before commencing with the execution of other blocks in FIG. 4. In this example, meta-refresh mechanism of browser 112 waits a threshold period time according to time intervals specified by a meta-refresh tag in frame definition 222 of page 220.

At block 420, the browser requests the frame document used to transport the updated data. In this example, meta-refresh mechanism 116 transmits a message to browser 112 specifying that browser 112 should reload the document. In response, browser 112 transmits a request to HTTP server 122 for frame document 240. At block 430, browser 112 receives the frame document 240.

REGENERATING THE FRAME DOCUMENT

Information is periodically transported to a browser via a regenerated frame document, which is transmitted to the browser. The frame document may be generated by modifying another document, referred to herein as a source document. A source document may be stored on, for example, the static memory of network element supplying the frame document.

FIG. 5A shows an exemplary source document 550. Source document 550 may contain HTML, JavaScript, or other code that may interpreted by a browser, or other data that may be used to generate a frame document. Embedded routines 542, such as routines 542-1 through 542-N, are routines defined by code in a source document. Routines 542-1–542-N may contain meta-language instructions 544-1–544-N, respectively. Meta-language instructions describe some aspect of a computer language. For example, meta-language instructions may specify another set of instructions in a particular computer language like JavaScript. The meta-language instructions may be interpreted and replaced with another set instructions as specified by the meta-language instructions.

For example, HTTP server 122 interprets and translates data in a source document before transmitting the document as modified. For purposes of illustration, routine 542-1 includes a combination of JavaScript that defines a routine for port 1 as follows.

```
port1_status() {
    <!--#exec cmd="show port 0"-->;
    return i;
}
```

The expression <!—#exec cmd="show port 0"—> is a metalanguage instruction that specifies instructions in JavaScript. Specifically, the metalanguage instructions specify code for initializing a variable i to a value indicating the status of a port, that is, active or inactive. After the meta-language instructions are interpreted and replaced, the following instructions for defining routine port1_status( ) may be generated.

```
port port1_status() {
    int i = 1;
    return i
}
```

Figure 5B:
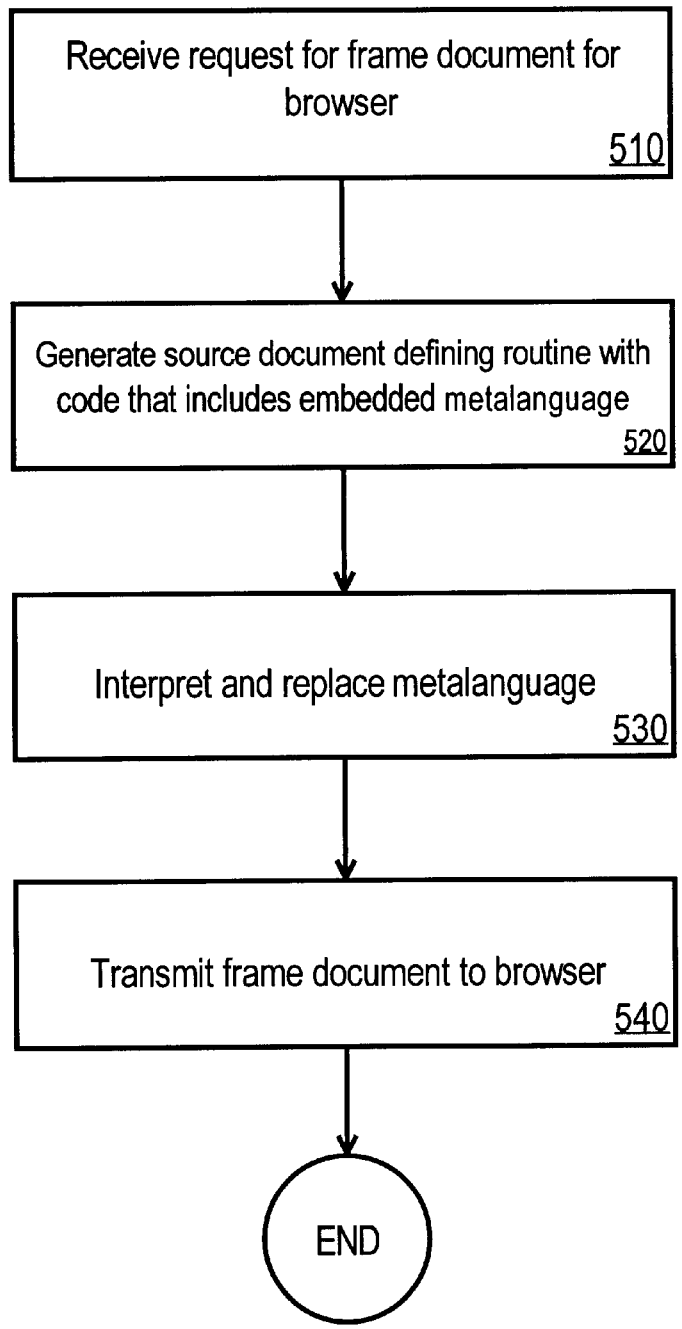
FIG. 5B is flow chart showing a process for generating a frame document.

FIG. 5B depicts a process for supplying to a browser a regenerated frame document. The process depicted in FIG. 5B is illustrated by example using the browser, network, and documents depicted in FIG. 1 and FIG. 2, and exemplary source document 550 in FIG. 5A.

Referring to FIG. 5B, at block 510, a request for a frame document is received. In this example, HTTP server 122 receives a request to provide frame document 240 from browser 112.

At block 520, a source document containing embedded meta-language instructions is generated. In this example, the source document 270 is retrieved from the static memory of network element 120.

Retrieving a stored document from the static memory of network element is only one example of a technique for generating a source document. Use of this technique, however, is not required. For example, the source document may be generated dynamically by invoking a software module that is configured to dynamically generate source document.

At block 530, meta-language instructions embedded in the source document are interpreted and replaced. In this example, the HTTP server 122 scans the source document, interprets and translates meta-language in the source document, and eventually produces the frame document that is transmitted to the browser at block 540.

Use of a meta-language to generate routines that supply the needed data is not required. Other techniques for generating routines may be used. For example, a software module on network device 120 may be configured to generate code defining routines that supply data reflecting the current status of a network element.

RETRIEVING DATA FROM THE FRAME DOCUMENT FOR SETTING PAGE PROPERTIES

Figure 6:
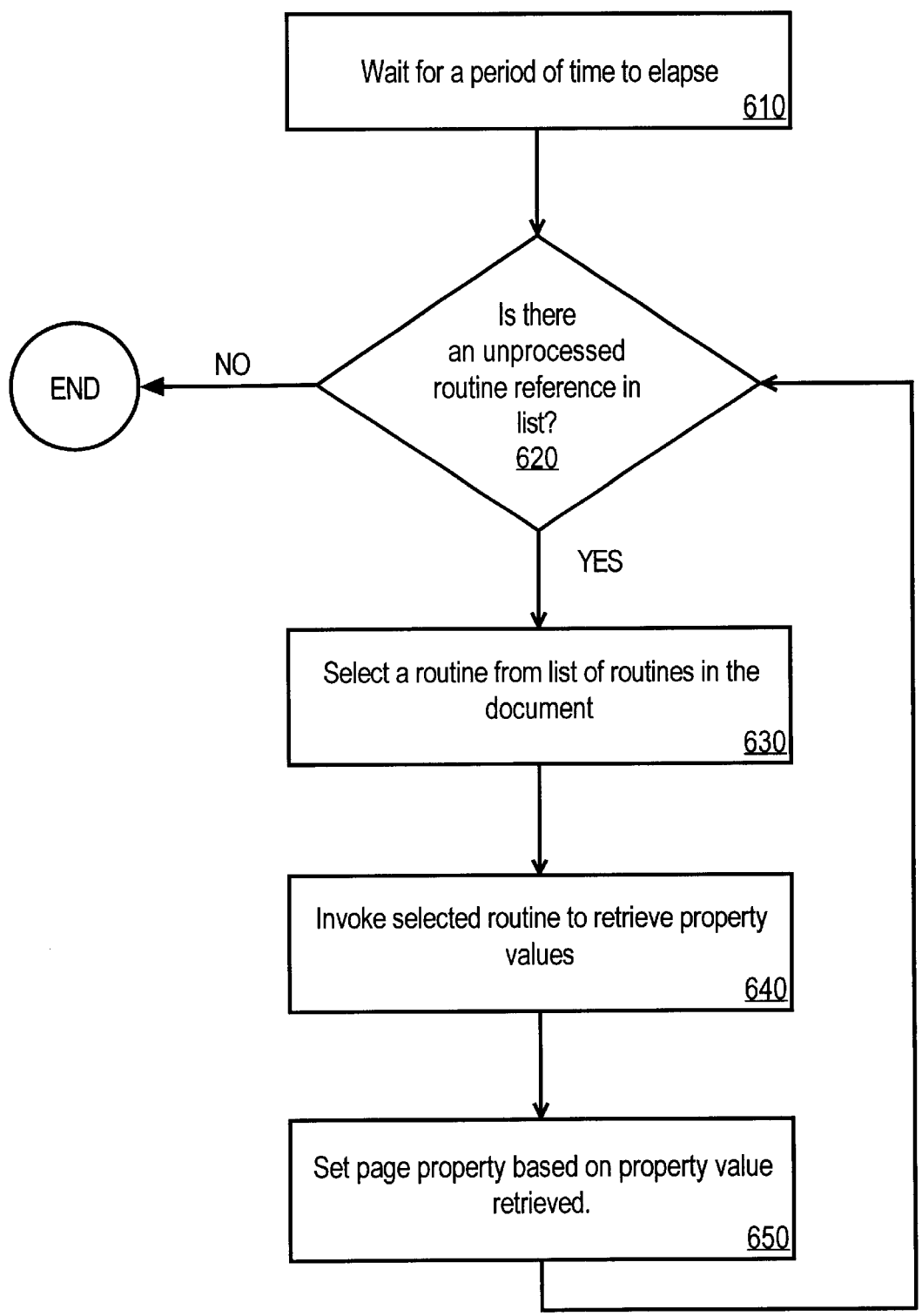
FIG. 6 is a flow chart showing a process for retrieving data from a page to update properties on a page.

FIG. 6 shows a process that may be used to periodically retrieve data from frame documents and to update page properties based on the retrieved data. Specifically, FIG. 6 shows a process used to retrieve data by invoking routines in the frame document. The process is illustrated by example using the browser, network, and documents depicted in FIG. 1 and FIG. 2.

Referring to FIG. 6, a browser waits for a threshold period of time before commencing with execution of the blocks depicted in FIG. 6. In this example, the timer mechanism 114 of browser 112 waits for a period before causing browser 112 to execute property update scripts 230.

Blocks 620 through 650 are executed as an iterative loop. In this example, the loop is performed in response to executing instructions in property update scripts 230.

At block 620, it is determined whether there is another unprocessed routine reference. An unprocessed routine reference is a routine reference that has not been selected at block 630 in a particular invocation of the loop defined by blocks 620–650. In this example, for purposes of illustration, no routine reference has yet been selected. Thus, control flows to step 630.

At block 630, an unprocessed routine reference is selected. In this example, routine reference 242-1 is selected.

At block 640, the routine referenced by the selected routine reference is invoked to retrieve the data. In this example, routine 242-1 is invoked, that is, port0_status. The routine returns a value.

At block 650, a page property is set based on the value returned from the routine invoked at block 640. In this example, a graphical control is updated in a row of a display table defined by port-status table definition 280. Thus, a page displayed by a browser is automatically updated with new property values without user action.

HARDWARE OVERVIEW

Figure 7:
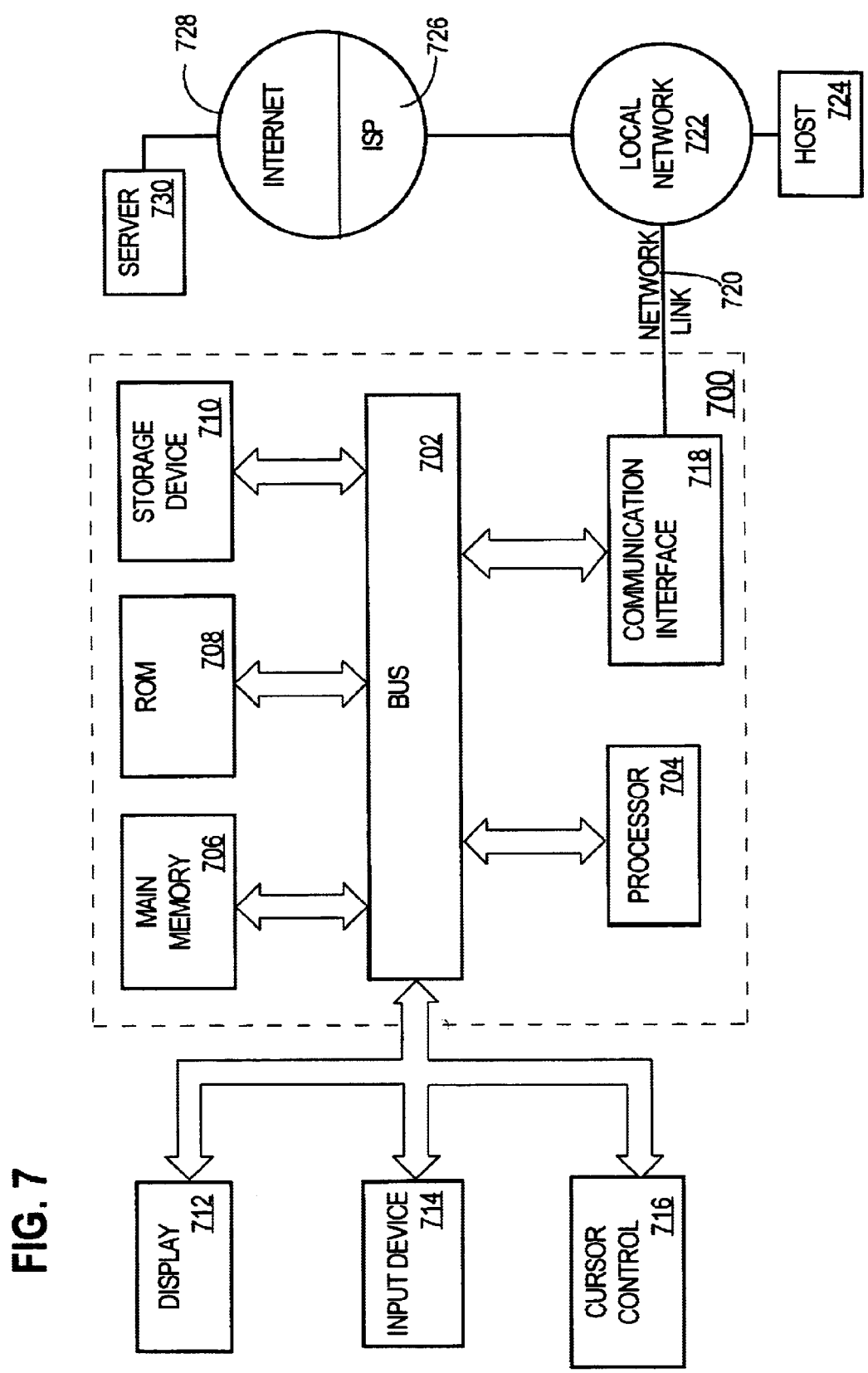
FIG. 7 is an exemplary computer system upon which an embodiment of the present invention may be implemented.

FIG. 7 is a block diagram that illustrates a computer system 700 which may be used to implement embodiment of the invention. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for providing a stream of data to a browser. According to one embodiment of the invention, providing a stream of data to a browser is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process blocks described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for providing a stream of data to a browser as described herein.

The received code may be executed by processor 704 as it is received, and/or stored in storage device 710, or other non-volatile storage for later execution. In this manner, computer system 700 may obtain application code in the form of a carrier wave.

The techniques described herein for supplying a stream of data to a browser are illustrated using an HTTP server that resides on a network element that periodically supplies a frame document. The frame document is used to indicate the properties of a GUI generated by browser. However, use of an HTTP server that resides on a network element is not required. An HTTP server residing on any network device will due. In addition, the data retrieved through a frame document may be used to update any property defined by a page loaded by a browser.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, the techniques described herein for supplying a stream of data to a browser are illustrated using an HTTP server that resides on a network element that periodically supplies a frame document. The frame document is used to indicate the properties of a GUI generated by a browser. However, use of an HTTP server that resides on a network element is not required. An HTTP server residing on any network device will due. In addition, the data retrieved through a frame document may be used to update any property defined by a page or documents.

What is claimed is:

1. A method of automatically periodically providing updates to information in a page that is displayed by a browser, the method comprising the steps of:

receiving from the browser periodic requests to supply a version of a frame document for a frame defined by the page;

in response to each request, generating another version of the frame document that contains code that:
  is not HTML code,
  is executable by the browser, and
  defines routines that are referenced by the page and that supply values of one or more page properties that are not properties of the frame document;

transmitting the other version of the frame document to the browser;

wherein said page includes a first reference, not in the frame document, that references the frame document; and wherein said page includes a second reference, not in the frame document and different than said first reference, that references a routine of said routines.

2. The method of claim 1, wherein the step of generating another version includes generating a first set of instructions that define a routine having one or more metalanguage instructions.

3. The method of claim 2, wherein the step of generating another version includes:

interpreting the one or more metalanguage instructions; and replacing the one or more metalanguage instructions with a second set of one or more instructions based on the step of interpreting the one or more metalanguage instructions.

4. The method of claim 3, wherein the step of replacing the one or more metalanguage instructions includes replacing the one or more metalanguage instructions with instructions that are interpretable using a scripting language.

5. The method of claim 3, wherein the step of generating another version that contains code includes generating JavaScript code that defines the one or more routines; and wherein the step of replacing the one or more metalanguage instructions includes replacing the one or more metalanguage instructions with Javascript code.

6. The method of claim 1, wherein the step of generating another version of the frame document includes generating another version of the frame document that includes one or more definitions of the one or more routines which, as redefined, reflect updated values for the one or more page properties.

7. The method of claim 1, wherein the step of generating another version of a frame document comprises generating another version of the frame document that includes one or more definitions of the one or more routines which, as redefined, reflect updated values for the one or more page properties; and wherein the updated values reflect a current state of a network device managed by a network management system.

8. The method of claim 1, wherein the step of receiving from the browser includes receiving from the browser periodic requests to supply a version of a frame document for a frame having a height value of zero and a width value of zero.

9. The method of claim 1,
wherein the step of generating another version of the frame document includes generating another version of the frame document that includes one or more definitions of the one or more routines which, as redefined, reflect updated values for the one or more page properties; and
wherein the step of receiving from the browser includes receiving from the browser periodic requests to supply a version of the frame document for a frame having a height value of zero and a width value of zero.

10. The method of claim 1, further comprising the steps of:
for each unprocessed routine reference in the page that refers to said one or more routines, selecting and invoking the unprocessed routine reference to create an updated value associated with at least one page property of the one or more page properties; and
setting the at least one page property associated with the updated value.

11. A method of retrieving data for a browser, the method comprising the steps of:
receiving a page that defines a frame and specifies a frame document for the frame;
periodically requesting a version of the frame document containing code that may be interpreted by the browser;
receiving the version of the frame document as requested;
periodically retrieving data from the version of the frame document to update one or more page properties that are not properties of the frame document;
wherein the step of receiving the version of the frame document includes receiving a version of the frame document that defines routine referenced by the page outside of the document;
wherein the step of periodically retrieving data from the version of the frame document includes invoking the routine; and
wherein the frame document defines the routines using code that is not HTML code.

12. The method of claim 11, wherein the step of receiving the version of the frame document includes receiving a version of the frame document that includes Javascript code that defines the routine.

13. The method of claim 11, wherein the step of periodically retrieving data from the frame document includes a timer mechanism periodically causing retrieval of data from the version of the frame document.

14. The method of claim 13,
wherein the step of periodically receiving the version of the frame document includes receiving a version of the frame document that defines a routine referenced by the page outside of the document; and
wherein the step of a timer mechanism periodically causing retrieval of data includes the timer mechanism causing an invocation of the routine.

15. The method of claim 13, wherein the steps of periodically requesting a version and receiving the version are performed as part of a metarefresh operation specified by HTML code in the page.

16. The method of claim 11, wherein the step of receiving a page includes receiving a page that defines a frame having a height value of zero and a width value of zero.

17. A network management system, comprising:
a network element;
said network element configured to receive from a browser periodic requests to supply a version of a frame document for a frame of a page;
said network element configured to respond to each request by generating another version of the frame document that contains code defining routines that are referenced by the page and that supply values of one or more page properties that are not properties of the frame document;
said network element configured to transmit over a network the other version of the frame document to the browser;
wherein said code:
is not HTML code, and
is executable by the browser;
wherein said page includes a first reference, not in the frame document, that references the frame document; and
wherein said page includes a second reference, not in the frame document and different than said reference, that reference a routine of said routines.

18. A network management system, comprising:
a network element;
said network element configured to receive from a browser periodic requests to supply versions of a frame document for a frame of a page;
said network element configured to respond to each request by generating a version of the frame document that includes:
code defining routines that are referenced by the page and which, as redefined, reflect updated values for one or more page properties that are not properties of the frame document, and
one or more metalanguage instructions included in a first set of instructions that is used to define at least one routine of said one or more routines;
said network element configured to replace, before transmitting the version of the frame document, the one or more metalanguage instructions with instructions that are interpretable using a scripting language;
said network element configured to transmit the version of the frame document;
wherein said code:
is not HTML code, and
is executable by the browser;
wherein said page includes a fist reference, not in the frame document, that references the frame document; and
wherein said page includes a second reference, not in the frame document and different than said first reference, that references a routine of said routines.

* * * * *

UNITED STATES PATENT AND TRADEMARK OFFICE
CERTIFICATE OF CORRECTION

PATENT NO.     : 6,701,368 B1
DATED          : March 2, 2004
INVENTOR(S)    : Krishna Rao Chennapragada et al.

It is certified that error appears in the above-identified patent and that said Letters Patent is hereby corrected as shown below:

<u>Column 13,</u>
Line 44, "routine" should read -- routines --;
Line 54, "Javascript" should read -- JavaScript --;

<u>Column 14,</u>
Lines 32-33, "than said reference, that reference" should read -- than said first reference, that references --;
Line 60, "fist" should read -- first --.

Signed and Sealed this

Eighteenth Day of May, 2004

JON W. DUDAS
*Acting Director of the United States Patent and Trademark Office*